United States Patent
Lee

(10) Patent No.: US 8,769,587 B2
(45) Date of Patent: Jul. 1, 2014

(54) METHOD AND APPARATUS FOR MANAGING BROADCAST FOR PORTABLE TERMINAL

(75) Inventor: Yong Ho Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 13/571,936

(22) Filed: Aug. 10, 2012

(65) Prior Publication Data

US 2013/0111524 A1   May 2, 2013

(30) Foreign Application Priority Data

Oct. 26, 2011 (KR) ........................ 10-2011-0110118

(51) Int. Cl.
- *H04N 7/20* (2006.01)
- *H04H 40/00* (2008.01)
- *H04W 36/00* (2009.01)
- *H04N 21/414* (2011.01)
- *H04W 36/32* (2009.01)
- *H04N 21/422* (2011.01)
- *H04H 60/32* (2008.01)

(52) U.S. Cl.
CPC .... *H04N 21/41422* (2013.01); *H04N 21/42202* (2013.01); *H04H 60/32* (2013.01); *H04W 36/32* (2013.01)
USPC .............................. 725/75; 455/3.06; 455/441

(58) Field of Classification Search
CPC .......... H04N 21/41422; H04N 21/414; H04N 21/42202; H04N 21/41407; H04N 21/422; H04H 60/29; H04H 60/32; H04W 36/24; H04W 36/32
USPC ................. 725/74, 75, 62, 132; 455/441, 3.06
See application file for complete search history.

(56) References Cited

U.S. PATENT DOCUMENTS

| | | | | |
|---|---|---|---|---|
| 5,239,667 A * | 8/1993 | Kanai | ............................ | 455/10 |
| 5,379,449 A * | 1/1995 | Porambo | ....................... | 455/506 |
| 6,181,921 B1 * | 1/2001 | Konisi et al. | ............... | 455/186.2 |
| 6,590,527 B2 * | 7/2003 | Mutoh et al. | ............. | 342/357.31 |
| 6,748,237 B1 | 6/2004 | Bates et al. | | |
| 6,934,547 B2 * | 8/2005 | Suzuki | ......................... | 455/441 |
| 8,112,780 B2 * | 2/2012 | Taura et al. | ..................... | 725/75 |
| 8,194,795 B2 * | 6/2012 | Yamamoto et al. | ........... | 375/340 |
| 8,244,267 B2 * | 8/2012 | Toda et al. | ................. | 455/452.1 |
| 8,406,715 B2 * | 3/2013 | Jaisimha et al. | ........... | 455/161.1 |

(Continued)

FOREIGN PATENT DOCUMENTS

| | | | |
|---|---|---|---|
| JP | 2008283374 A | 11/2008 | |
| WO | 0122633 A1 | 3/2001 | |

*Primary Examiner* — James R Sheleheda
(74) *Attorney, Agent, or Firm* — Jefferson IP Law, LLP

(57) ABSTRACT

A method and an apparatus for managing a broadcast for a portable terminal receiving supplementary information related to the broadcast are provided. The method includes tuning a broadcasting receiver of the portable terminal to a frequency from among a plurality of frequencies of a broadcasting channel, receiving, by the broadcasting receiver, a broadcasting signal on the tuned frequency, determining whether a moving speed of the portable terminal is equal to or more than a predetermined speed when a broadcasting receiver is tuned to the frequency and is receiving a broadcasting signal, measuring a field strength of the received broadcasting signal when the moving speed of the portable terminal is equal to or greater than the predetermined speed, and controlling the broadcasting receiver to be tuned to another frequency in order to receive the broadcasting signal of the broadcasting channel when the measured field strength is less than a predetermined threshold.

10 Claims, 4 Drawing Sheets

(56) References Cited

U.S. PATENT DOCUMENTS

| | | | |
|---|---|---|---|
| 2001/0012781 A1* | 8/2001 | Suzuki | 455/456 |
| 2002/0101374 A1* | 8/2002 | Mutoh et al. | 342/357.09 |
| 2002/0161454 A1 | 10/2002 | Mukai et al. | |
| 2006/0195239 A1* | 8/2006 | Teichner et al. | 701/36 |
| 2008/0098439 A1* | 4/2008 | Taura et al. | 725/75 |
| 2009/0247099 A1* | 10/2009 | Jaisimha et al. | 455/161.2 |
| 2009/0313008 A1* | 12/2009 | Okada et al. | 704/10 |
| 2011/0117915 A1* | 5/2011 | Chang | 455/435.3 |
| 2011/0124288 A1* | 5/2011 | Chen et al. | 455/42 |
| 2012/0008719 A1* | 1/2012 | Shirasuka et al. | 375/316 |
| 2012/0123908 A1* | 5/2012 | Eich et al. | 705/27.1 |
| 2013/0035051 A1* | 2/2013 | Mujtaba et al. | 455/277.2 |
| 2013/0130675 A1* | 5/2013 | Yi et al. | 455/424 |
| 2013/0344803 A1* | 12/2013 | Isu et al. | 455/39 |

\* cited by examiner

METHOD AND APPARATUS FOR MANAGING BROADCAST FOR PORTABLE TERMINAL

PRIORITY

This application claims the benefit under 35 U.S.C. §119(a) of a Korean patent application filed on Oct. 26, 2011 in the Korean Intellectual Property Office and assigned Serial No. 10-2011-0110118, the entire disclosure of which is hereby incorporated by reference.

BACKGROUND OF THE INVENTION

1. Field of the Invention

The present invention relates to a method and an apparatus for managing a broadcast for a portable terminal. More particularly, the present invention relates to a method for managing a broadcast for a portable terminal, wherein the portable terminal may receive supplementary information related to the broadcast and provide various functions by utilizing the received supplementary information, and an apparatus thereof.

2. Description of the Related Art

In recent years, with the significant developments in information and communication technology and semiconductor technology, the use of portable terminals has rapidly increased. Recent portable terminals have been developed so as to provide a greater number of functions and operations on the portable terminals. For example, portable terminals, which may also be referred to as mobile communication terminals, provide various functions such as a Television (TV) watching function (e.g., mobile broadcasting such as Digital Multimedia Broadcasting (DMB) or Digital Video Broadcasting (DVB)), a music playing function (e.g., Motion Picture Expert Group (MPEG)-1 or MPEG-2 Audio Layer-3 (MP3)), a camera function, an Internet access function, as well as a general communication function such as speech call or message transmission/reception, and other similar functions.

A portable terminal may receive supplementary information about a broadcast (e.g., information about traffic, broadcasting programs, etc.) that is received and may provide functions utilizing the received supplementary information. However, because the functions utilizing supplementary information may be configured to be always activated or turned on without reference to a user's needs, unnecessary power consumption may result from the functions being always activated. In order to reduce power consumption, a user may set the functions to be inactivated when receiving a broadcast. However, in such a case, the user may not be able to receive guidance corresponding to supplementary information at a moment that the user needs such guidance.

SUMMARY OF THE INVENTION

Aspects of the present invention have been made to address the above-mentioned problems and/or disadvantages described below. Accordingly, an aspect of the present invention is to provide a method and an apparatus for managing a broadcast for a portable terminal which performs functions related to supplementary information in accordance with an environment that the portable terminal is used in while a broadcasting signal is received and played back.

Another aspect of the present invention is to provide a method and an apparatus for managing a broadcast for a portable terminal that may reduce power consumption by the portable terminal by determining whether functions related to the supplementary information are performed according to the environment in which the portable terminal is used.

In accordance with an aspect of the present invention, a method of managing a broadcast for a portable terminal is provided. The method includes tuning a broadcasting receiver of the portable terminal to a frequency from among a plurality of frequencies of a broadcasting channel, receiving, by the broadcasting receiver, a broadcasting signal on the tuned frequency, determining whether a moving speed of the portable terminal is equal to or more than a predetermined speed when the broadcasting receiver is tuned to the frequency from among the plurality of frequencies of the broadcasting channel and the broadcasting receiver receives the broadcasting signal, measuring a field strength of the received broadcasting signal when the moving speed of the portable terminal is equal to or more than the predetermined speed, and controlling the broadcasting receiver, such that the broadcasting receiver is tuned to another frequency from among the plurality of frequencies of the broadcasting channel in order to receive the broadcasting signal of the broadcasting channel when the measured field strength is less than a predetermined threshold.

In accordance with another aspect of the present invention, an apparatus for managing a broadcast for a portable terminal is provided. The apparatus includes a broadcasting receiver for tuning to a frequency from among a plurality of frequencies of a broadcasting channel and for receiving a broadcasting signal including supplementary information via the tuned frequency, an audio processor for converting an audio signal into an audible sound and for outputting the audible sound, the audio signal being included in the broadcasting signal received by the broadcasting receiver, a display for displaying a video signal included in the broadcasting signal received by the broadcasting receiver; and a controller for controlling an output of the broadcasting signal so as to be displayed on the display unit, for measuring a field strength of the received broadcasting signal when a moving speed of the portable terminal is equal to or more than a predetermined speed while receiving the broadcasting signal, and for controlling the broadcasting receiver to be tuned to another frequency from among the plurality of frequencies when the measured field strength is less than a predetermined threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

DETAILED DESCRIPTION OF EXEMPLARY EMBODIMENTS

Figure 1:
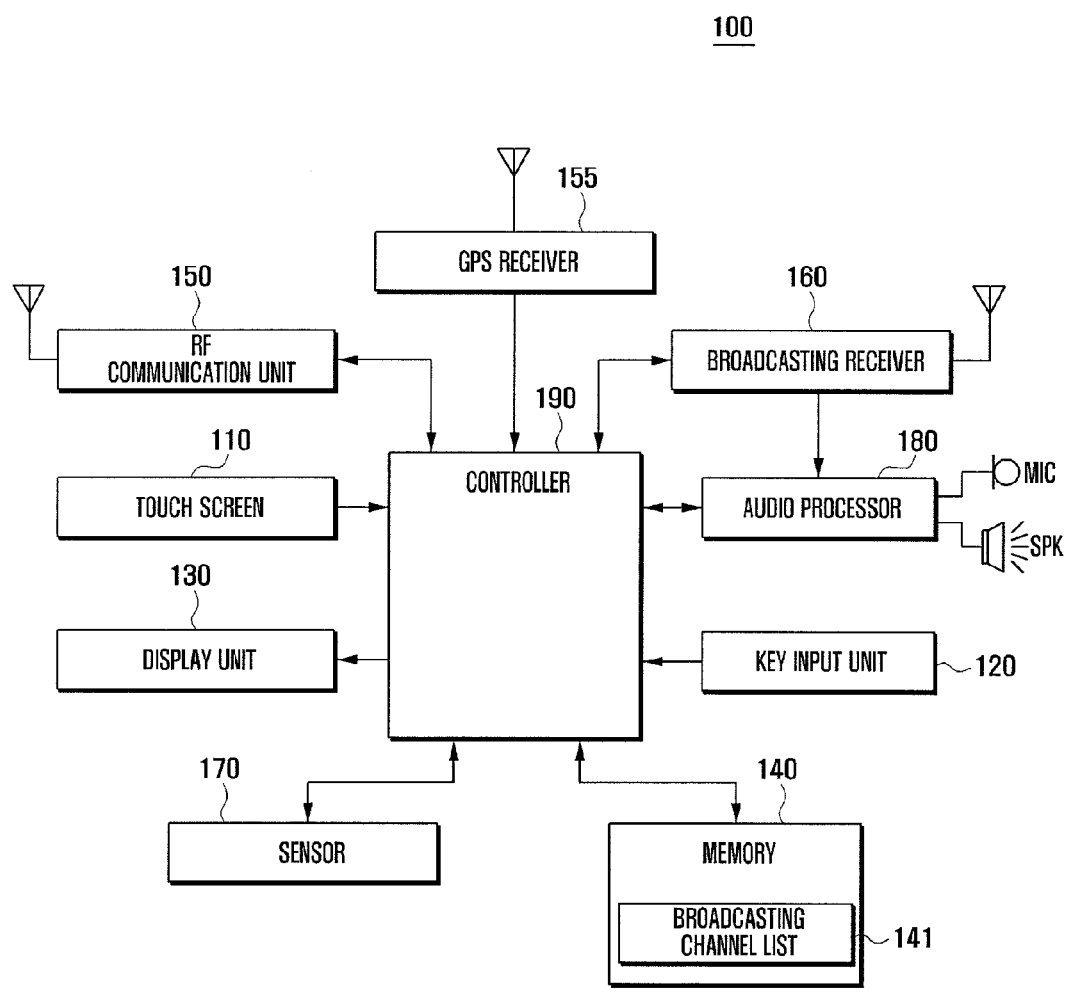
FIG. 1 is a block diagram illustrating a configuration of a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A portable terminal according to the present exemplary embodiments may be any of a type of device which supports functions of receiving a broadcasting signal and reproducing the received broadcasting signal. For example, a portable terminal may be any of various information and communication devices, multi-media devices, digital broadcasting players, Personal Digital Assistants (PDAs), Smart Phones, mobile phones, tablet Personal Computers (PCs), hand-held PCs as well as various mobile communication terminals operating based on communication protocols corresponding to various communication systems, and other similar portable electronic devices.

Furthermore, a portable terminal according to the present exemplary embodiments may provide functions for receiving supplementary information related to a broadcast and utilizing the received supplementary information. For example, the supplementary information may include traffic information, broadcasting station information, broadcasting program information, frequency information about a broadcasting channel, and other similar information. A broadcasting station may provide the supplementary information in a form of text or voice sound. For example, as is well known to those of ordinary skill in the art, a Radio Data System (RDS) is a system for providing such supplementary information which is added to a Frequency Modulation (FM) radio broadcasting signal. The portable terminal may receive a broadcasting signal including the supplementary information and demodulate it, such that the portable terminal may use the supplementary information. For example, the portable terminal may provide functions for displaying broadcasting program information as a type of text, providing traffic information as a voice sound, automatically changing to another frequency of the same broadcasting channel when a field strength of the currently received broadcasting signal, which may be periodically measured, is less a predetermined threshold as an Automatic Frequency (AF) function, or other similar functions, which a user may arbitrarily set whether to use those functions.

In particular, the portable terminal, according to the present exemplary embodiments, determines whether to adaptively use the functions in accordance with a user's environment in which the portable terminal is being operated while receiving a broadcast, such that the function of reducing power consumption is provided. That is, although any or all of the functions are configured to be performed, particular ones or all of the functions may be not executed if they are not used for operation of the portable terminal at a particular time.

FIG. 1 is a block diagram illustrating a configuration of a portable terminal according to an exemplary embodiment of the present invention.

Referring to FIG. 1, a portable terminal 100 according to the present exemplary embodiment includes a touch screen 110, a key input unit 120, a display unit 130, a memory 140, a Radio Frequency (RF) communication unit 150, a Global Positioning System (GPS) receiver 155, a broadcasting receiver 160, a sensor 170, an audio processor 180, a speaker SPK, a microphone MIC, and a controller 190.

The touch screen 110 may be disposed at a front of the display unit 130, and may generate and provide a touch event to the controller 190 in response to a user operation, i.e., a user touching a finger, a stylus, or some other similar object, on the touch screen 110. The user operation may be classified into a touch, a tap, a double tap, a press, a drag, a drag & drop, a sweep, or any other similar gesture. The touch is an operation where a user pushes or touches one point of the touch screen 110. The tap is an operation where a finger is released from a corresponding touch point without movement of the finger along the touch screen 110 after touching one point. The double tap is an operation where a user touches or taps a corresponding touch point twice within a predetermined amount of time. The press is an operation where a finger is released from a corresponding point without movement of the finger after touching it for a time period longer than a time period corresponding to the tap. The drag is an operation that moves a finger in a direction or along a drag path in a state that one point is touched. The drag & drop is an operation that releases a touch after drag. The sweep is an operation that releases a finger after moving it at high speed along the touch screen 110. The drag may also be referred to as a scroll and the sweep may also be referred to as a flick. The controller 190 may distinguish between the sweep and the drag according to respective moving speeds of the operations. The controller 190 controls the above noted elements of the portable terminal 100 in response to the touch events.

The key input unit 120 may include a plurality of input keys for operating the portable terminal 100, and may provide a key signal corresponding to operation of the input keys to the controller 190. The controller 190 controls the above elements in response to the key signal. The key signal may be any one of a power on/off signal, a volume control signal, a screen on/off signal, or other similar signals. The display unit 130 may convert video data inputted from the controller 190 into an analog signal in order to display the converted analog signal. That is, the display unit 130 may display various pictures or images corresponding to uses of the potable terminal, such as a standby picture, a menu picture, a message writing picture, a call picture, an Internet picture, a broadcast picture, or other similar pictures and images. In particular, the display unit 130 according to the present exemplary embodiment may provide a broadcast picture including supplementary information.

The display unit 130 may be configured as a flat panel display such as a Liquid Crystal Display (LCD), an Organic Light Emitted Diode (OLED) display, an Active Matrix Organic Light Emitted Diode (AMOLED) display, or any other similar or suitable display. Furthermore, the display unit 130 may include a 3 Dimensional (3D) implementing part for displaying a left eye image and a right eye image and controlling the respective images such that a user perceives a depth feeling for the displayed left eye and right eye images. The 3D implement part may be at least one of a glasses type and an auto-stereoscopic type. The glasses type may be one of a color filter type, a deflection filter type, and a shutter glass type, and the auto-stereoscopic type may be one of a lenticular lens type and a parallax barrier type. However, the present invention is not limited thereto, and the 3D implementing part may be any suitable type of unit or system for providing 3D images.

The memory 140 may store pictures, images, text, videos, or any other type of data to be displayed on the display unit 130 as well as an operating system (OS) of a portable terminal 100 and a variety of applications, operations, and programs used by the portable terminal 100. The memory 140 may temporally store data copied from a message, a photograph, a web page, or a document which is copied by a user for pasting it. In particular, when the portable terminal 100 is in a currently receiving state of a broadcasting channel, then the memory 140, according to the present exemplary embodiment, may temporally store supplementary information, particularly frequency information on the broadcasting channel to which the broadcasting receiver 160 is currently tuned. When the field strength of the currently tuned frequency signal is less than a predetermined threshold, the controller 190 may automatically tune to another frequency for the corresponding broadcasting channel with reference to the temporally stored frequency information, such that the controller 190 makes it possible to provide a function of seamless playback of broadcast information.

The memory 140 may include a program area and a data area. The data area may store data created by the controller 160 according to use of the portable terminal 100. The data area may also store various keypads for inputting data so as to be displayed on the touch screen 110. Here, the keypad may be any of a Qwerty keypad, a 3*4 keypad, a special keypad, a numeral keypad, an English letter keypad, a Korean letter keypad, or any other suitable or similar keypad. Furthermore, the keypad may include a menu for controlling an application currently being executed by the portable terminal 100, a clipboard for inputting temporally stored data, emoticons, or other similar text and images. When the receiving of a broadcast is finished, the frequency of the broadcasting signal received just before the finishing of the receiving of the broadcast (hereinafter, referred to as a 'last frequency' for convenience of description) may be stored in the data area of the memory 140. Additionally, a broadcasting channel list 141 may be stored in the data area. The broadcasting channel list 141 includes area information of a broadcasting channel and frequency information of each broadcasting area. The area information may be administrative district information, latitude/longitude information, or any other similar information.

For example, the broadcasting channel list 141 may be stored as shown in Table 1 below. The data area may include a map database, which may be stored in a remote server, and the portable terminal 100 may connect with the remote server and download the map information including the area information from the remote server.

TABLE 1

| | | First Area | Second Area | Third Area |
|---|---|---|---|---|
| Broadcasting Station A | First Broadcasting channel | 103.1 MHz | 99.1 MHz | 95.1 MHz |
| | Second Broadcasting channel | 107.7 MHz | 102.3 MHz | 93.1 MHz |
| Broadcasting Station B | Third Broadcasting channel | 97.3 MHz | 105.7 MHz | 89.5 MHz |
| | Fourth Broadcasting channel | 95.9 MHz | 104.5 MHz | 91.9 MHz |

The program area may store an Operating System (OS) for booting the portable terminal 100 and for operating the components mentioned above, and may also store applications for respectively supporting various user functions, such as a user function for supporting a call function, a web browser for connecting with an Internet server, an audio player function for reproducing music file, audio files, and other sound source files, an image outputting function for reproducing a photograph or images, a moving picture reproducing function for reproducing videos, or other similar functions. In particular, the program area stores applications for broadcasting reception and playback and an application for reducing power consumption by determining whether to perform functions related to supplementary information according to an environment in which the portable terminal 100 is being used during broadcasting reception and playback. According to the present exemplary embodiment, the application for reducing power consumption is automatically executed. However, the present invention is not limited thereto, and the application for reducing power consumption may be executed according to a user's desires.

The application for reducing power consumption may include routines for controlling the GPS receiver 155 and the sensor 170 in order to determine whether the portable terminal 100 is moving, for measuring a field strength of a received broadcasting signal when the portable terminal 100 is moving, for terminating the Automatic Frequency (AF) function when the portable terminal 100 is not moving, for determining a current location of the portable terminal 100 when broadcasting reception is performed, for determining whether the portable terminal 100 is located in a broadcasting area corresponding to the last frequency, for controlling such the portable terminal 100 such that it is tuned to the frequency of the broadcasting area when the portable terminal 100 is not located in the broadcasting area corresponding to the determination result, for terminating the display function from among the functions utilizing the supplementary information when the screen is turned off, and for terminating a voice guide function when the portable terminal 100 is set to a vibration mode.

The RF communication unit 150 may form a communication channel for voice call, a communication channel for video phone call, and a communication channel for data communication for data, such as images or messages, under the control of the controller 170. That is, the RF communication unit 150 forms a voice call channel, a data communication channel, and a video phone call channel between the portable terminal 100 and a base station, or other similar network entity of a mobile communication systems. To do this, the RF communication unit 150 may include an RF transmitter for up-converting a frequency of a signal for transmission and amplifying the signal, and an RF receiver for low-noise-amplifying a received signal and down-converting a frequency of the signal.

The GPS receiver 155 receives GPS signals including transmission times transmitted from three GPS satellites or more according to a control of the controller 190, and measures distances between the GPS receiver 155 (or in other words, the portable terminal 100) and each of the GPS satellites based on time differences between the transmission times and respective received times at which the GPS signals are received. Furthermore, the GPS receiver 155 may determine the location of the portable terminal 100, that is, the GPS receiver 155 may generate a two-dimensional coordinate value (i.e., a latitude value and a longitude value) based on the measured distance information, and may transfer the determined location information to the controller 190.

The broadcasting receiver 160 may receive a broadcasting signal including supplementary information from a broadcasting station under control of the controller 190, may demodulate the received signal to a digital signal, and may transfer the demodulated broadcasting signal to the controller 190. Furthermore, the broadcasting receiver 160 may directly transfer a broadcasting signal of the demodulated signal to the audio processor 180. Although not shown, the broadcasting receiver 160 may include a Digital Multimedia Broadcasting (DMB) receiving module, a Digital Audio Broadcasting (DAB) receiving module, and a multiplex broadcasting receiving module. The multiplex broadcasting receiving module may conform to a variety of standards, such as the RDS of Europe, a Radio Broadcast Data System (RBRD) of the United States, a Data Radio Channel (DARC) of Japan, or any other suitable or similar standard. Hereinafter, the AF function of the RDS is described as one exemplary embodiment of a frequency tuning function. However, the present invention is not limited thereto, and it would have been obvious to one of ordinary skill in the art that it could be applied to not only the radio broadcasting like the RDS but also the digital broadcasting such as the DMB and the DAB.

The sensor 170 senses information related to a speed of the portable terminal 100 and provides the sensed information to the controller 190. Accordingly, the sensor 170 may include an acceleration sensor or any other similar sensor for determining a speed of the portable terminal 100. The sensor 170 senses a speed by converting a physical amount, such as a change in an electrical current or voltage, into an electric signal, performs an analog-to-digital conversion of the electrical signal, and converts the electric signal into sensed data so as to transfer the sensed data to the controller 190.

The audio processor 180 processes and transfers an audio signal received from the controller 190 or the broadcasting receiver 160 to the speaker SPK and also processes and transfers an audio signal of a voice or sound inputted through the microphone MIC to the controller 190. In other words, the audio processor 180 converts voice and/or sound data into an audible sound to be output by the speaker SPK under the control of the controller 190, and converts an audio signal of a voice or sound inputted through the microphone MIC into a digital signal so as to be transferred to the controller 190.

The controller 190 may control a signal flow for operations of internal elements of the portable terminal 100 and for processing data. The controller 190 may also control a power supply from a battery to the internal elements of the portable terminal 100. In particular, the controller 190, according to the present exemplary embodiment, may terminate the AF function described above when the portable terminal 100 does not move at or greater than a predetermined speed. Because the AF function may be turned off at times, such as when the broadcasting area may be changed, the controller 190 may inactivate or turn off the AF function at times such as when the power consumed should be reduced. That is, if the field strength is measured according to a command or a request for a measurement rather than being measured periodically, then the controller 190 may reduce the power used for measuring the field strength by only providing power for the field strength measurement according to the command or the request for the measurement.

The controller 190 may determine whether the portable terminal 100 is located in a broadcasting area corresponding to the last frequency of a previous broadcasting reception when a new broadcasting reception is executed. When the portable terminal 100 is not located in the broadcasting area corresponding to the last frequency, then the controller 190 controls the broadcasting receiver 160 to allow the broadcasting receiver 160 to be tuned to a frequency corresponding to a broadcasting area in which the portable terminal 100 is currently located. For example, referring to Table 1, after a user has finished listening to a broadcast in the first area, and the user moves into a third area and then starts to listen to another broadcast, then the controller 190 may immediately control the broadcasting receiver 160 so that it is tuned to a frequency of the third area without confirming a received field strength measurement by tuning to a frequency of the second area. Thus, the controller 190 may save power used for searching for available frequencies.

Furthermore, the controller 190 may terminate a display function from among the functions operating corresponding to the supplementary information when a screen of the display unit 130 is turned off Additionally, when the portable terminal 100 is set in the vibration mode, the controller 190 may terminate a voice guide function from among the functions operating corresponding to the supplementary information. Thus, the controller 190 may be operated in a power saving mode.

As described above, the controller 190, according to the present exemplary embodiment, provides a function of reducing power consumption by determining whether to perform functions related to or corresponding to supplementary information according to the environment in which a portable terminal 100 is used during broadcasting reception and playback.

Although not shown in FIG. 1, the portable terminal 100, according to the present exemplary embodiments, may also include structural elements having additional functions such as a camera module for capturing still images and moving pictures or videos of an object, a near distance communication module for short-range RF or Infrared (IR) communication, an audio playback module such as a music player, and an Internet communication module for performing an Internet function, or other similar structural elements that may be provided on a portable terminal or portable electronic device.

Figure 2:
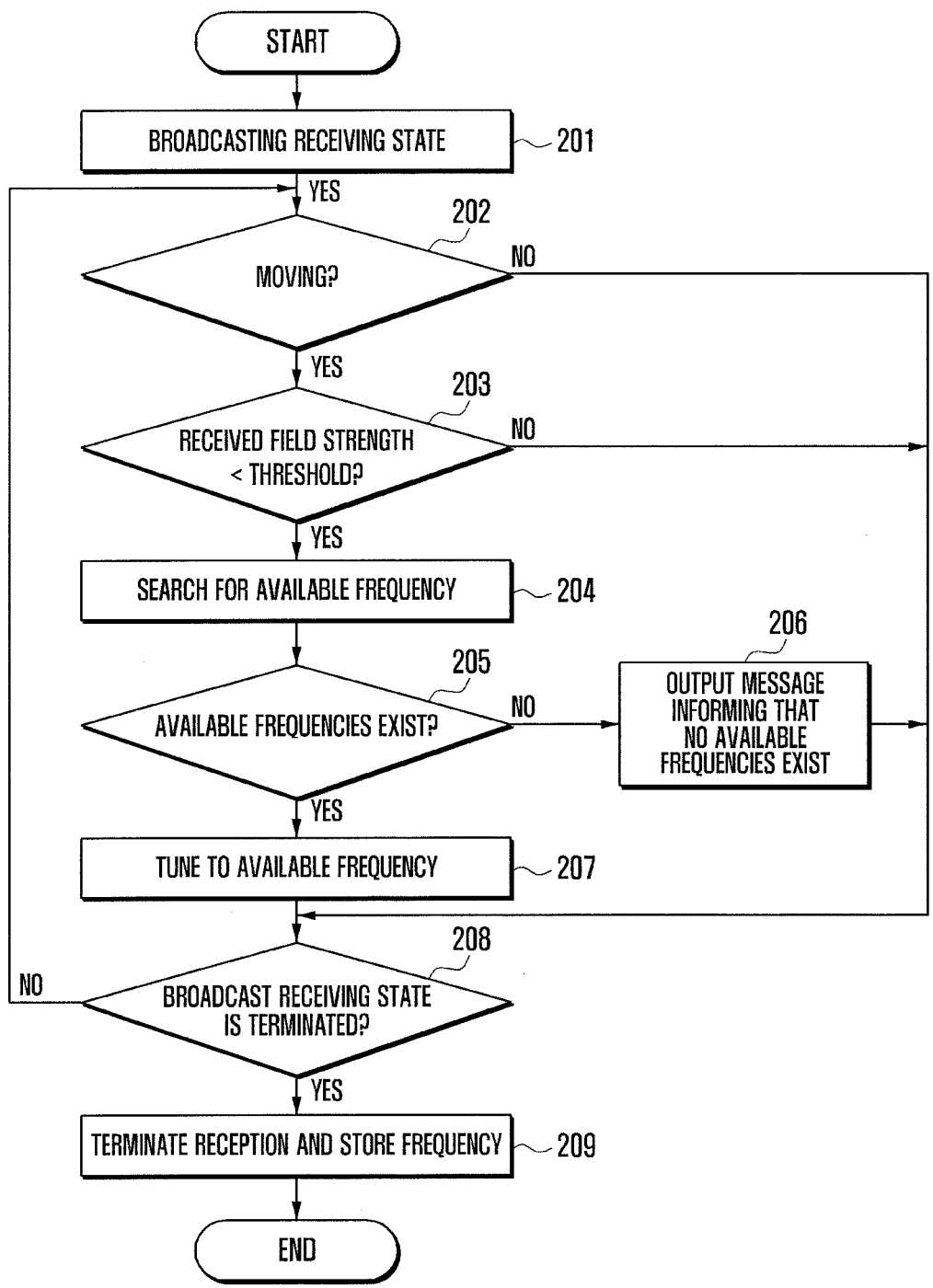
FIG. 2 is a flowchart illustrating a method of managing a broadcast according to an exemplary embodiment of the present invention.

FIG. 2 is a flowchart illustrating a method of managing a broadcast according to an exemplary embodiment of the present invention.

Referring to FIGS. 1 and 2, in step 201, the controller 190 is in a broadcasting receiving state. That is, the display unit 130 and the audio processor 180 output the broadcasting signal and supplementary information under control of the controller 190 so as to be viewed and heard by a user of the portable terminal 100. Next, in step 202, the controller 190 may determine whether the portable terminal 100 is moving at or greater than the predetermined speed. That is, as discussed above with reference to FIG. 1, the controller 190 may determine the speed of the portable terminal 100 by controlling the GPS receiver 155 and the sensor 170.

If it is determined in step 202 that the portable terminal 100 is moving at or greater than the predetermined speed, then the controller 190 may perform the AF function and proceeds to step 203. The controller 190 measures the field strength of the broadcasting signal received by the broadcasting receiver 160 in step 203, and compares the received field strength with a predetermined threshold. If it is determined at step 203 that the received field strength is equal to or greater than the predetermined threshold, then the controller 190 maintains the state of receiving the current broadcasting channel and proceeds to step 208, which is discussed below.

On the other hand, if it is determined at step 203 that the received field strength is less than the predetermined threshold, then in step 204, the controller 190 may search for available frequencies through which the broadcasting reception of the broadcasting channel may be received. That is, the controller 190 controls the broadcasting receiver 160 to allow the broadcasting receiver 160 to be tuned to another frequency of the broadcasting channel using frequency information temporarily stored in the memory 140. The controller 190 may control the broadcasting receiver 160 such that the frequency tuning is performed according to a predetermined order. For example, it is assumed that the frequency information includes the first frequency and the second frequency, and that information corresponding to the first frequency is received first. Accordingly, the controller 190 may control the broadcasting receiver 160 so that it is first tuned to the first frequency. However, if the strength of the broadcasting signal of the first frequency is less than the threshold, then the controller 190 controls the broadcasting receiver 160 so that it is next tuned to the second frequency.

Furthermore, the controller 190 may control the broadcasting receiver 160 in order to allow the broadcasting receiver 160 to be tuned to another frequency of the broadcasting channel using the broadcasting channel list 141 stored in the memory 140. When the broadcasting channel list 141 is used, the controller 190 controls the broadcasting receiver 160 such that it is first tuned to a frequency of an area adjacent to an area of a current location of the portable terminal 100. That is, the controller 190 controls the GPS receiver 155 such that the GPS receiver 155 determines the current location of the portable terminal 100. Then, the controller 190 controls the broadcasting receiver 160 to be tuned to the frequency of the nearest area to the current location according to the broadcasting channel list 141. Thus, the controller 190 may save power used for measuring the receiving field strength.

After searching for the available frequencies in step 204, then, in step 205, the controller 190 may determine whether the available frequencies that were searched for in step 204 exist. If it is determined in step 205 that any of the available frequencies do not exist, then, in step 206, the controller 190 controls the display unit 130 and the audio processor 180 such that a message for informing the user that there no available frequencies exist is output to the user. On the other hand, if it is determined in step 205 that an available frequency exists, then the controller controls the broadcasting receiver 160 to be tuned to the available frequency in step 207. Next, in step 208, if it is determined by the controller 190 that a touch event related to termination of the broadcasting receiving state has occurred on the touch screen 110, then the controller 190 controls the broadcasting receiver 160 such that the broadcasting reception is terminated in step 209. Also, in step 209, before terminating the broadcasting reception, the controller 190 stores the frequency that was tuned to in step 207 in the memory 140. However, if, in step 208, it is determined by the controller 190 that a touch event related to termination of broadcasting reception has not occurred on the touch screen 110, then the controller 190 maintains the broadcasting receiving station so that the portable terminal 100 remains in the broadcasting receiving state.

Figure 3:
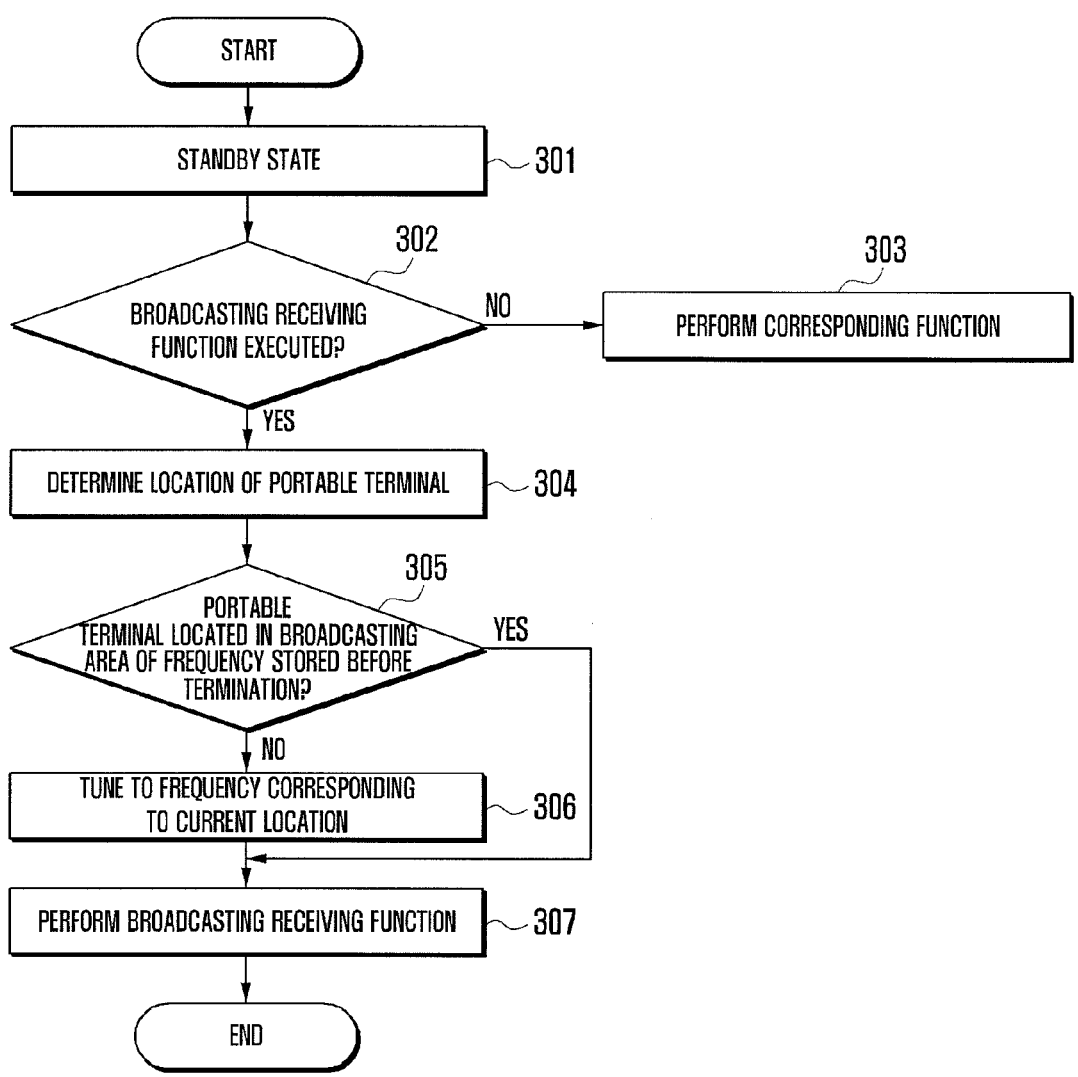
FIG. 3 is a flowchart illustrating a method of managing a broadcast according to an exemplary embodiment of the present invention.

FIG. 3 is a flowchart illustrating a method of managing a broadcast according to an exemplary embodiment of the present invention.

Referring to FIGS. 1 and 3, the controller 190 is in a standby state so as to be waiting for a user input in step 301. In the standby state, the controller 190 may receive a signal corresponding to a touch event from the touch screen 110. Then, in step 302, the controller 190 may determine whether the broadcasting receiving function is executed according to the touch event. If it is determined that the broadcasting receiving function is not executed according to the touch event in step 302, then the controller 190, in step 303, performs a function related to the touch event.

On the other hand, if it is determined in step 302 that the touch event is for executing the broadcasting receiving function, then, in step 304, the controller controls the GPS receiver 155 such that a location of the portable terminal 100 is determined. Next, the controller 190 may determine whether the portable terminal 100 is located in a broadcasting area corresponding to the last frequency stored in the memory 140 just before a previous termination of a broadcasting receiving state in step 305. If it is determined, in step 305, that the portable terminal 100 is not located in the broadcasting area corresponding to the last frequency, then the controller 190 controls the broadcasting receiver 160 so as to be tuned to a frequency corresponding to the current location of the portable terminal 100 in step 306. At step 307, the controller 190 may be in a broadcasting receiving state in order to perform the broadcasting receiving function. However, if it is determined in step 305 that the portable terminal 100 is located in the broadcasting area corresponding to the last frequency, then the controller 190 skips step 306 and proceeds to step 307 in order to control the broadcasting receiver 160 so as to be tuned to the last frequency used to receive a broadcasting signal.

Figure 4:
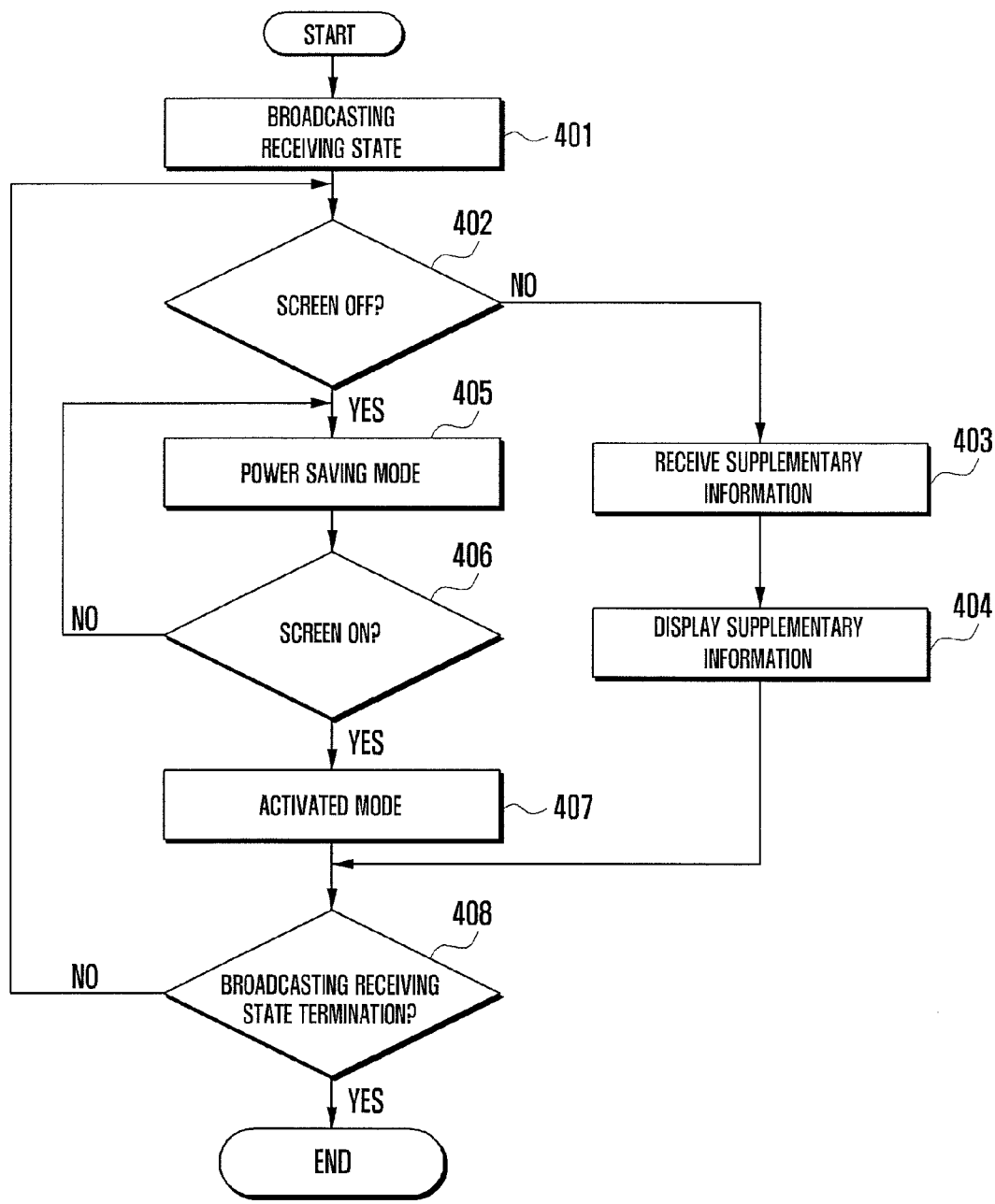
FIG. 4 is a flowchart illustrating a method of managing a broadcast according to an exemplary embodiment of the present invention.

FIG. 4 is a flowchart illustrating a method of managing a broadcast according to an exemplary embodiment of the present invention.

Referring to FIGS. 1 and 4, the controller 190 is in a broadcasting receiving state in step 401. In the broadcasting receiving state, the controller 190 may determine whether to perform a screen off function in step 402. For example, when the broadcasting signal is a Television (TV) broadcasting signal, the controller 190 may determine that a screen on state should be maintained so as to operate the display unit 130 and the touch screen 110 for receiving a touch event. If it is determined in step 402 that the screen on state is to be maintained, or in other words, if it is determined in step 402 that the screen off function is not to be performed, then the controller 190 receives supplementary information in step 403. Next, the controller 190 may display the received supplementary information in step 404.

However, if it is determined in step 402 that the screen off function is to be executed, i.e., if it is determined that the display unit 130 may be turned off, then the controller 190 may be operated in a power saving mode in step 405. According to an exemplary embodiment of the present invention, it may be determined that the screen off function is to be executed in a case where the broadcasting signal is a radio signal, i.e., an audio signal, and no touch event has occurred on the touch screen 110 for a predetermined amount of time. That is, in order to reduce power consumption of a battery of the portable terminal 100, the controller 190 does not receive the supplementary information. Then, if it is determined that the screen is to be turned on in step 406, then the controller 190 may be operated in an activated mode in step 407. That is, in the activated mode, the controller 190 may receive the supplementary information and control the display unit 130 such that the supplementary information is displayed. Next, in step 408, if it is determined that a touch event related to termination of the broadcasting receiving state is received from the touch screen 110, then the controller 190 may terminate the broadcasting receiving state. However, if it is determined, in step 408, that no touch event related to termination of the broadcasting receiving state is received, then the controller 190 may maintain the broadcasting receiving state and return to step 402.

The foregoing method for managing a broadcast according to the exemplary embodiments of the present invention may be implemented in an executable program command formed by various computer means and be recorded in a non-transitory computer readable recording medium. In this case, the non-transitory computer readable recording medium may include a program command, a data file, and a data structure individually or a combination thereof. In the meantime, the program command recorded in the non-transitory computer readable recording medium may be specially designed or configured for the exemplary embodiments of the present invention or may be in a form known to a person having ordinary skill in a computer software field.

The non-transitory computer readable recording medium may be any one of a Magnetic Media, such as a hard disk, a floppy disk, a magnetic tape, an Optical Media such as a Compact Disc (CD) or a Digital Versatile Disc (DVD), a Magneto-Optical Media such as floptical disk, a hardware device such as a Read Only Memory (ROM), a Random Access Memory (RAM), a flash memory storing and executing program commands, or any other suitable non-transitory storage medium. Furthermore, the program command may include a machine language code created by a complier and a high-level language code executable by a computer using an interpreter. The foregoing hardware devices may be configured to be operated as at least one software module to perform an operation of the present invention.

A method and an apparatus for managing a broadcast for a portable terminal according to the exemplary embodiments of the present invention may perform functions related to supplementary information according to an environment in which the portable terminal is being used while a broadcasting signal is received and played back by the portable terminal, and may reduce power consumption by determining whether functions related to the supplementary information are to be performed in correspondence to the environment in which the portable terminal is used.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of managing a broadcast for a portable terminal, the method comprising:
   tuning a broadcasting receiver of the portable terminal to a frequency from among a plurality of frequencies of a broadcasting channel;
   receiving, by the broadcasting receiver, a broadcasting signal on the tuned frequency;
   determining whether a moving speed of the portable terminal is equal to or greater than a predetermined speed when the broadcasting receiver is tuned to the frequency from among the plurality of frequencies of the broadcasting channel and the broadcasting receiver receives the broadcasting signal;
   activating measurement of a field strength of the received broadcasting signal when the moving speed of the portable terminal is equal to or greater than the predetermined speed; and
   controlling the broadcasting receiver, such that the broadcasting receiver is tuned to another frequency from among the plurality of frequencies of the broadcasting channel in order to receive the broadcasting signal of the broadcasting channel when the measured field strength is less than a predetermined threshold.

2. The method of claim 1, wherein the receiving of the broadcasting signal comprises:
   determining a location of the portable terminal; and
   controlling the broadcasting receiver to be tuned to the frequency from among the plurality of frequencies,
   wherein the frequency corresponds to the determined location.

3. The method of claim 1, further comprising:
   storing the frequency to which the broadcasting receiver is tuned before termination of a broadcasting receiving function upon the termination of the broadcasting receiving function;
   determining a location of the portable terminal when the broadcasting receiving function is executed; and
   controlling the broadcasting receiver such that the broadcasting receiver is tuned to another frequency from among the plurality of frequencies when the determined location is out of a broadcasting area of the stored frequency,
   wherein the other frequency corresponds to the determined location of the portable terminal.

4. The method of claim 1, further comprising:
   terminating a guide function for displaying supplementary information included in the broadcasting signal of the broadcasting channel on a display unit of the portable terminal when a screen of the display unit is in an off mode; and
   activating the guide function for the displaying of the supplementary information on the display unit when the screen of the display unit is switched to be in an on mode.

5. The method of claim 4, wherein the guide function provides audible instructions and information corresponding to the broadcasting signal to a user of the portable terminal.

6. An apparatus for managing a broadcast for a portable terminal, the apparatus comprising:
   a broadcasting receiver for tuning to a frequency from among a plurality of frequencies of a broadcasting channel and for receiving a broadcasting signal including supplementary information via the tuned frequency;
   an audio processor for converting an audio signal into an audible sound and for outputting the audible sound, the audio signal being included in the broadcasting signal received by the broadcasting receiver;
   a display unit for displaying a video signal included in the broadcasting signal received by the broadcasting receiver; and
   a controller for controlling an output of the broadcasting signal so as to be displayed on the display unit, for activating measurement of a field strength of the received broadcasting signal when a moving speed of the portable terminal is equal to or greater than a predetermined speed while receiving the broadcasting signal, and for controlling the broadcasting receiver to be tuned to another frequency from among the plurality of frequencies when the measured field strength is less than a predetermined threshold.

7. The apparatus of claim 6, further comprising:

a Global Positioning System (GPS) receiver for determining a location of the portable terminal using GPS signals received from GPS satellites and for transferring information about the determined location to the controller; and a memory for storing a broadcasting channel list including broadcasting area information corresponding to each of the plurality of frequencies of the broadcasting channel, wherein the controller controls frequency tuning according to the broadcasting channel list and the determined location of the portable terminal.

8. The apparatus of claim 7, wherein the controller controls a storing of a frequency to which the broadcasting receiver is tuned before a termination of a broadcasting receiving function when the broadcasting receiving function is terminated, wherein, when the broadcasting receiving function is executed, the location of the portable terminal is determined, wherein, when the determined location is not in a broadcasting area corresponding to the stored frequency according to the broadcasting channel list, the broadcasting receiver is tuned to another frequency from among the plurality of frequencies of the broadcasting channel, and wherein the other frequency corresponds to the determined location of the portable terminal.

9. The apparatus of claim 6, wherein the broadcasting receiver receives frequency information including information corresponding to the plurality of frequencies of the broadcasting channel.

10. The apparatus of claim 6, further comprising a sensor for sensing information related to the moving speed of the portable terminal, wherein the sensor is controlled by the controller.

* * * * *